Aug. 21, 1962  E. O. SCHONSTEDT  3,050,679
DEVICE FOR DETECTING OR MEASURING MAGNETIC FIELDS
Filed Feb. 18, 1960  2 Sheets-Sheet 1

Inventor
ERICK O. SCHONSTEDT
By R. J. Tompkins
Attorney

Aug. 21, 1962 E. O. SCHONSTEDT 3,050,679
DEVICE FOR DETECTING OR MEASURING MAGNETIC FIELDS
Filed Feb. 18, 1960 2 Sheets-Sheet 2

Inventor
ERICK O. SCHONSTEDT

United States Patent Office 3,050,679
Patented Aug. 21, 1962

1

3,050,679
DEVICE FOR DETECTING OR MEASURING
MAGNETIC FIELDS
Erick O. Schonstedt, Silver Spring, Md., assignor to the United States of America as represented by the Secretary of the Navy
Filed Feb. 18, 1960, Ser. No. 9,660
5 Claims. (Cl. 324—43)

This invention relates to a device having field sensing elements which detect magnetic field intensity and more particularly to a magnetic gradiometer which is suitable for field use and is of simple construction.

In the field of metal detection, i.e., mine detection, lost torpedoes, etc., it has been the general practice to employ gradiometers to detect the difference in magnetic field intensity between such objects (which create disturbances in the normal earth's magnetic field) and the surrounding magnetic field. Gradiometers generally employ two magnetic field sensing elements that are spaced a short distance apart. The signal output of the field-sensing elements are connected so as to oppose each other. Thus, if the assembly of these elements is moved about in a uniform magnetic field no signal indication is produced. By being near a ferromagnetic object, the field at one sensing element will be greater than at the other element so an unbalance will exist and a signal produced.

In some gradiometers, the field sensing elements are sensitive only to the component of field parallel with an inherent axis of sensitivity. Therefore, for a gradiometer employing such elements to function satisfactorily the axes of the elements must be aligned and remain aligned precisely parallel. Previous adjusting devices have served the purpose but they have not proved entirely satisfactory in maintaining precise alignment of the coils under field service conditions for the reasons that shock forces incurred during field use knock the coils out of alignment. Additionally, ease of field adjustment is also missing.

The general purpose of this invention is to provide a gradiometer which embraces all the advantages of similarly employed gradiometers and possesses none of the aforesaid disadvantages. To attain this, the present invention contemplates a unique means for aligning the axes of the field sensing elements that does not rely on the rigidity of the outer case. Additionally, adjustment is achieved through a minimum of mechanical elements with maximum accuracy and speed.

An object of the present invention is the provision of means to accurately adjust a gradiometer so that no signal will be produced when the gradiometer is in a uniform magnetic field.

Another object is to provide a gradiometer which will remain accurately adjusted while being used in the field.

A further object of the invention is the provision of means to rapidly adjust a gradiometer in the field.

Other objects and many of the attendant advantages of this invention will be readily appreciated as the same becomes better understood by reference to the following detailed description when considered in connection with the accompanying drawings wherein.

Figure 1:
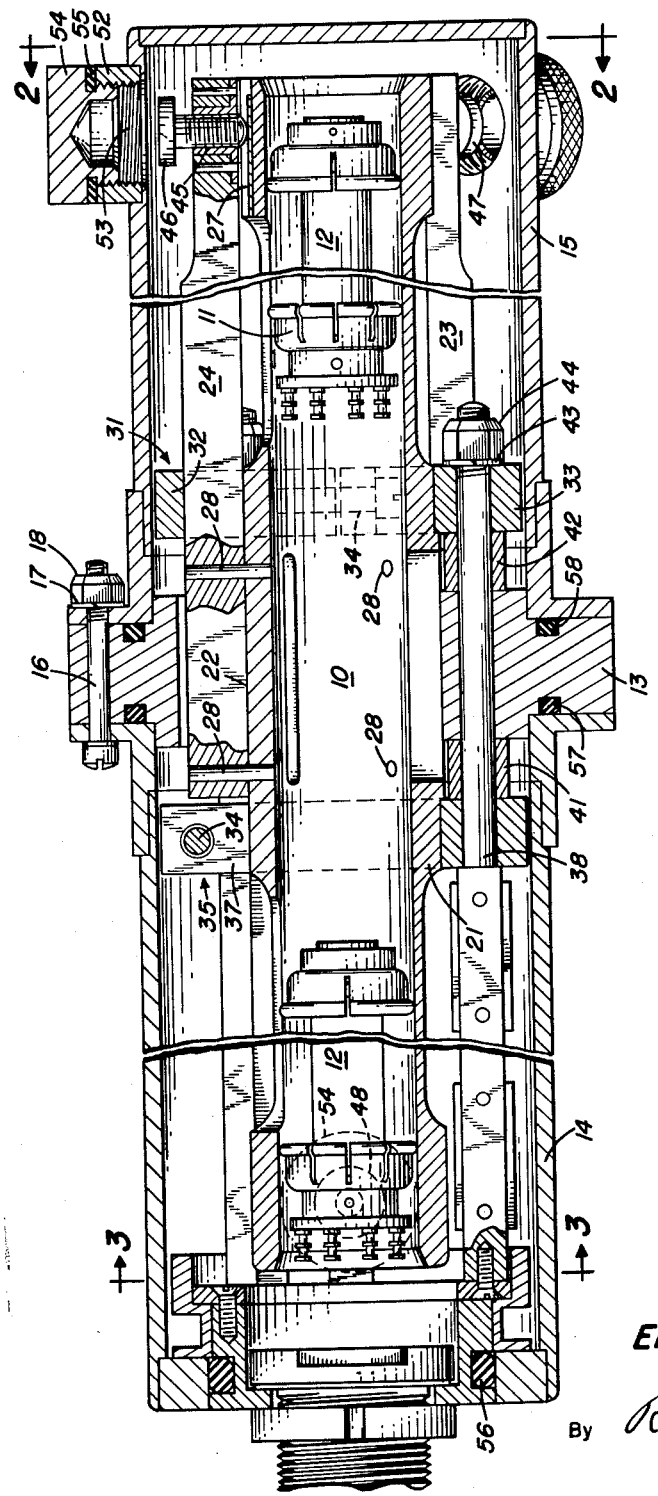
FIG. 1 shows a longitudinal cross-section of a preferred embodiment of the invention taken along line 1—1 of FIG. 2.

Referring now to the drawings, wherein like reference characters designate like or corresponding parts throughout the several views, there is shown in FIG. 1 a hollow tube 10 having open ends in which field sensing elements 12 are mounted. Hollow tube 10 is mounted in an annular resilient mounting block 13 which is fastened to outer casing sections 14 and 15 by bolts 16, lock washers 17 and nuts 18.

Figure 2:
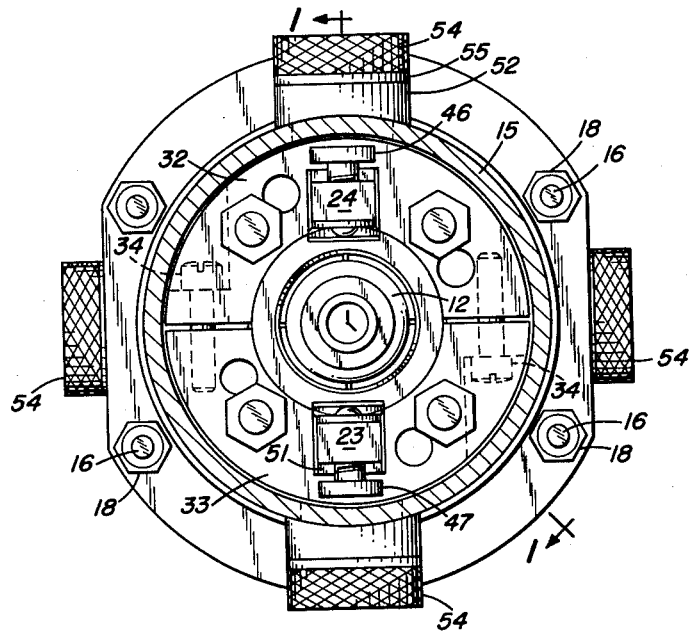
FIG. 2 shows an end view partially in section looking in the direction of the arrows of line 2—2 of FIG. 1.
Figure 3:
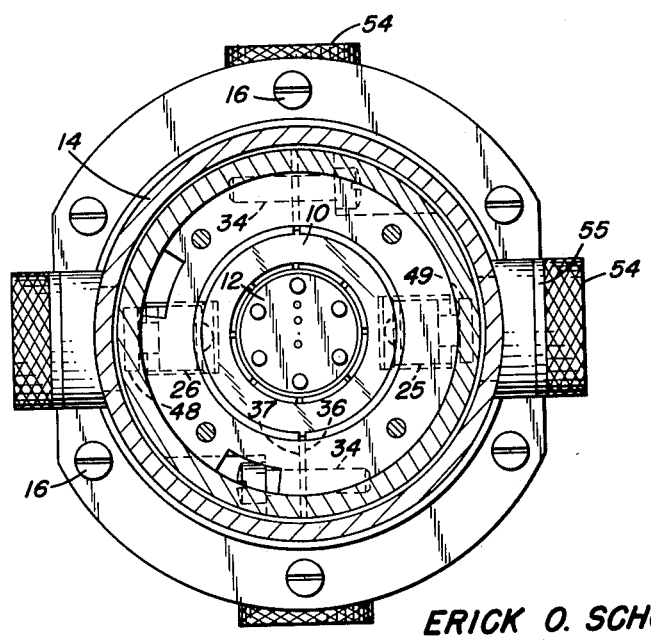
FIG. 3 shows an end view partially in section looking in the direction of the arrows of line 3—3 of FIG. 1.

Hollow tube 10 has an enlarged diameter at its center 21 with milled flats 22 for seating vertical adjusting bars 23 and 24 and horizontal adjusting bars 25 and 26. See FIGS. 2 and 3. The end of tube 10 is milled flat at 27 as shown in FIGS. 2 and 3.

Each adjusting bar 23—26 has two pins 28 holding the bars to tube center 21. Additionally, the vertical adjusting bars 23 and 24 are clamped to tube 10 by a clamp 31 having an upper half 32 and a lower half 33. The clamp sections are held together by two clamp screws 34—see FIG. 2. The horizontal adjusting bars 25 and 26 are clamped to tube 10 by a clamp 35 having a right half 36 and left half 37. Halves 36 and 37 are held together by two screws 34 as shown in FIG. 3.

The clamps 31 and 35 are held in axial alignment by bolts 38. Spacer plates 41 and 42 fit between clamps 31 and 35 and mounting block 13. Axial movement is prevented by lock washers 43 and nuts 44 being tightened on bolts 38.

Each adjusting bar has a threaded end portion 45 in which adjusting screws 46, 47, 48, 49 are threaded. Adjusting screws 46, 47, 48, 49 bear against flats 27 so that when the screws are turned, tube 10 will deflect. Screw stops 51 limit the amount tube 10 can be deflected. The outer casing sections 14 and 15 have nipples 52 mounted thereon. The nipples form port 53 which provides access to adjusting screws 46, 47, 48, 49 so that alignment of field sensing elements 11 and 12 may be made without removing the adjusting assembly from the outer casing. A given port 53 is sealed by cap 54 and gasket 55. O-rings 56, 57, 58 are employed to seal the remaining joints of the assembly.

The alignment of coils 11 and 12 so that their axes of sensitivity will be parallel is carried out as follows: The vertical adjusting bars 23 and 24 as shown in FIG. 2 allow field sensing element 12 to be moved in a vertical plane. In order to adjust tube 10 vertically downward the caps 54 adjacent screws 46 and 47 are removed. See FIG. 2. Screw 47 is loosened so that it does not contact flat portion 27. Vertical alignment of tube 10 then proceeds by turning screw 46. When the final alignment is almost achieved a greater micrometer effect can be obtained by bringing screw 47 in contact with flat 27. In so doing, as tube 10 is bent, this bending will be resisted by the bending of bar 23. Bar 24 then must be bent by a greater force to achieve a given deflection of tube 10. The stiffness ratios of bars 23 and 24 to tube 10 will depend upon the amount of deflection of tube 10 that is desired and the stresses that can be tolerated in the materials. Stops 51 limit the travel of the adjusting screws so that bars 23 and 24 cannot be bent beyond their elastic limits.

A similar adjusting procedure is used to align the coils in a horizontal direction. It is readily apparent from FIG. 3 how hollow tube 10 is adjusted in a horizontal plane.

Obviously many modifications and variations of the present invention are possible in the light of the above teachings. It is therefore to be understood that within the scope of the appended claims the invention may be practiced otherwise than as specifically described.

What is claimed is:

1. In a magnetic gradiometer, a hollow tube having an enlarged diameter at the center of its longitudinal dimension, a pair of detector elements mounted in said tube for movement therewith, a pair of adjusting bars attached at one end to said center of said hollow tube and extending along said hollow tube, adjusting screw means on said bars attached to the end of said bars remote from their position of attachment to said tube, said adjusting screw means contacting the end of said tube for moving said tube and one of said detector elements with respect to the other of said detector elements wherby the axes of said detector elements can be brought into parallelism.

2. In a magnetic gradiometer, an outer casing, a hollow tube having an enlarged diameter at the center of its longitudinal dimension, a resilient block holding said hollow tube within said outer casing, a detector element mounted in each end of said hollow tube for movement therewith, adjusting bars having threaded ends, adjusting screws threaded in said threaded ends, said adjusting screws extending transverse of said tube and contacting the ends of said hollow tube to move said tube whereby the axes of said detector elements can be brought into parallelism.

3. In a magnetic gradiometer, a first outer casing segment, a second outer casing segment, an annular resilient block bolted between said outer casing segments, a hollow tube having a built-up center mounted in said annular resilient block, a detector element mounted in each end of said hollow tube for movement therewith, a first bar attached to said built-up center, a second bar attached to said built-up center on the opposite side from said first bar, said bars having threaded ends, screws in said threaded ends making contact with said hollow tube, there being access means in said outer casing segments adjacent said screws whereby said screws are actuated from the exterior of said outer casing to move said hollow tube so that the axes of said detector elements are brought into parallelism.

4. In a magnetic gradiometer, a first outer casing segment, a second outer casing segment, an annular resilient block bolted between said outer casing segments, a hollow tube having a built-up center and flat end portions mounted in said annular resilient block, a detector element mounted in each end of said hollow tube for movement therewith, a first pair of bars pinned at said built-up center, a second pair of bars pinned at said built up center, a first clamp holding said first pair of bars at said center and a second clamp holding said second pair of bars at said center, said bars having threaded ends, screws in said threaded ends contacting said flat portions, there being access means in said outer casing segments adjacent said screws whereby said screws are actuated from the exterior of said outer casing to move said hollow tube so that the axes of said detector elements are brought into parallelism.

5. In a magnetic gradiometer, a first outer casing section, a second outer casing section, an annular resilient block bolted between said sections, a hollow tube having a built-up center and flat end portions mounted in said annular block, field sensing coils mounted in each end of said hollow tube for movement therewith, a first pair of bars extending the length of said first outer casing and being pinned, one bar opposite the other, to said built-up center, a second pair of bars extending the length of said second outer casing and being pinned to said built-up center, one bar opposite the other, in a plane perpendicular to the plane in which the first said pair lies, a first clamp holding said first pair of bars at said center, a second clamp holding said second pair of bars at said center, said bars having threaded ends, screws in said threaded ends contacting said flat end portion, there being a port in said outer casing opposite each screw, cap means sealing said ports, whereby adjustment of said screws causes one end of said hollow tube to move in a horizontal plane and the opposite end of said hollow tube to move in a vertical plane so that the axes of said field sensing coils are brought into parallelism.

References Cited in the file of this patent
UNITED STATES PATENTS

| | | |
|---|---|---|
| 2,642,479 | Jones | June 16, 1955 |
| 2,996,663 | Ferguson | Aug. 15, 1961 |